United States Patent Office 3,671,302
Patented June 20, 1972

3,671,302
IMPREGNATING POROUS CERAMICS WITH NONCOLLOIDAL SOLIDS
David J. Nell, West Mifflin, and Thomas W. Lewis II, Bethel Park, Pa., assignors to Dresser Industries, Inc., Dallas, Tex.
No Drawing. Filed Oct. 30, 1967, Ser. No. 679,191
Int. Cl. C04b 21/00
U.S. Cl. 117—123 A          4 Claims

ABSTRACT OF THE DISCLOSURE

Impregnating porous ceramic articles with noncolloidal ceramic particles comprising, preparing a suspension in a carrier fluid of noncolloidal ceramic particles, immersing the ceramic articles in the slurry, maintaining said particles dispersed, and agitating the slurry for sufficient period of time to impregnate at least a portion of the ceramic articles.

BACKGROUND

Most all sintered or ceramically-bonded ceramic articles that do not have a substantial amount of a glassy phase are porous. Their porosity typically ranges between 10 and 30 percent. The nature of the porosity varies considerably, depending on the particular ceramic oxide or oxides from which the article is manufactured. The nature of the porosity also depends upon the particle-size distribution of the raw materials batch used in the manufacture. For example, the major portion of the open and connected pores of super duty silica brick have a minimum size that ranges from about 9 to 45 microns; the pores of fireclay brick range from about 9 to about 100 microns, the pores of magnesite brick from 9 to 45 microns, and the pores of zircon brick from about 4 to 15 microns. The pores of zircon brick are noticeably smaller than those of others. This is because zircon brick is generally prepared from batches having a fine particle size distribution.

It is generally considered that ceramic brick or shapes are improved by reducing their porosity. This is because their strength is increased either by increase of effective cross-section, or by elimination of stress risers around large pores. Furthermore, since most refractory ceramics (referred to as refractories) which are used in industry are used in contact with a chemical or metallurgical process, they must have an ability to withstand chemical attack by reaction, corrosion, or erosion. This resistance is increased by reducing the porosity of the refractories. Sometimes, it is merely necessary to reduce the porosity of the surface of a refractory to substantially increase its resistance to chemical or slag attack.

Techniques for reducing the porosity of refractories include impregnating with tars, salt solutions, or colloidal suspensions. Impregnating with tars is very satisfactory where it is desired to fill the pores with carbon. Tars are easily made to penetrate most refractories by first evacuating the air within the pores by applying a vacuum, and thereafter pressure impregnating with tar that is heated to render it liquid. Solutions, for example, sodium chromate or chromic acid may be used to impregnate ceramic articles. This impregnation can be carried out by the vacuum-pressure technique described for tars. Generally, this technique is unsatisfactory because impregnation and drying steps must be repeated many times in order to deposit any substantial amount of impregnant. Colloidal suspensions are somewhat more successful, see for example, U.S. Pat. No. 3,236,665, which teaches impregnating silica brick with a colloidal silica sol. Colloidal solutions can be used to impregnate ceramics by the vacuum-pressure technique. Unfortunately, colloidal solutions are very expensive to prepare, and are not readily available. (Generally, colloidal particles vary in size between 10 and 1,000 angstroms.)

There are, however, a large number of ceramic oxides available as discrete particles ranging from 0.1 micron to about 5 microns. Ceramic articles cannot be impregnated with suspensions prepared from these particles by the pressure impregnation technique. The particles merely gather on the surface of the refractory article when pressure impregnation is attempted. The article seems to act like a sieve and the pores thereof become blinded. We have now discovered a method for impregnating refractory articles with noncolloidal ceramic particles.

BRIEF DESCRIPTION OF THE INVENTION

According to this invention, ceramic articles with interconnected interior pore structure are impregnated with finely divided dispersed noncolloidal ceramic particles by first, preparing a suspension of the noncolloidal particles; second, immersing the ceramic article in the suspension; and third, agitating or vibrating the suspension for sufficient period of time to impregnate at least a portion of the ceramic articles. Typically, the noncolloidal ceramic particles range in size from 0.1 micron to about 5 microns. Preferably, the particles should range in size from 0.5 to 2.5 microns. The suspension, for example, is prepared by mixing the particles with from about 50 to 90 percent of a suitable carrier fluid. A readily available carrier fluid is water. However, when impregnating certain refractories having a tendency to hydrate, it is preferable to use organic liquids, for example, alcohol.

It has been found desirable to prepare the slurry using a dispersing agent appropriate to both the ceramic particles and the carrier fluid. The agitation or vibration can be applied in a number of ways, for example, mechanically. The frequency of the vibration can range from about 20 cycles/sec. to ultrasonic vibration in the range of 40 kcs./sec. The amplitude of the vibration is usually limited by the equipment and the frequency. (Generally speaking, the amplitude is less than about 1 cm.) However, it has been found that for a given frequency the largest possible amplitude is desirable.

DETAILED DESCRIPTION

Further features and other objects and advantages of this invention will become clear to those skilled in the art by careful study of the following detailed description. In the following description and in the claims, all percentages, ratios, and parts are by weight.

Example I

In this and the following examples, small zircon discs approximately 2½ inches in diameter and 1 inch deep were impregnated with noncolloidal ceramic particles. The effectiveness of the technique was measured by weighing the zircon discs before and after impregnating. The after-weight was determined after all of the carrier fluid had been removed by drying. Zircon was chosen because it has a pore size distribution substantially smaller than most refractory articles and was considered, therefore, more difficult to impregnate.

A 20 percent suspension of pigment grade chromic oxide was prepared by blending the chromic oxide into the water. The particle size of the chromic oxide ranged from about 0.5 to 1.5 microns. The blending was facilitated by the addition of 0.8 percent of sodium phosphate dispersant sold under the trademark Darvan 7 by the R. T. Vanderbilt & Company, New York, N.Y. After the suspension was prepared, the zircon disc was immersed in the suspension and the suspension vibrated at 60 cycles/sec. for 30 minutes. 2.06 grams of pigment grade chromic oxide were deposited in the pores of the zircon shape. This then is the best mode now known for the practice of this invention. The large surface of the discs was perpendicular to the direction of the vibration during vibration. These surfaces were substantially more penetrated by the chomic oxide than other surfaces. Hence, it is believed that for best results the vibration be directed perpendicular to the surfaces which are to be impregnated.

Example II

Example II was run in the same manner as Example I, except that the amplitude of vibration was reduced about 10 percent. In this example, 1.74 grams of chromic oxide were deposited within the pores of the zircon shape indicating the desirability of increased amplitude.

Example III

Example III was prepared in the same manner as Example II, except that no suspending agent was used in the preparation of the suspension. Only 0.08 gram of chromic oxide were deposited in the zircon shape demonstrating the essentiality of preparing a well dispersed suspension.

Example IV

Example IV was prepared in the same manner as Example III, except that the suspension was prepared with only 10 percent chromic oxide. 0.65 gram of chromic oxide was deposited in the zircon disc. It is believed that the suspension should contain as much noncolloidal solid particles as can be suspended without undesirable settling-out of the suspension.

Example V

In Examples I through IV, the particle size of the chromic oxide ranged from about 0.5 to 1.5 microns. In this example, the particle size of the chromic oxide ranged from about 0.1 to 0.5 micron. A 10 percent suspension was prepared as in the last example with the use of the dispersing agent Darvan 7. Only 0.15 gram of chromic oxide was deposited in the zircon test piece. It is not completely understood why the smaller particle size of the chromic oxide used in this example hindered impregnation. However, it is believed that the larger surface of the finer chromic oxide made dispersing the particles more difficult. Agglomeration of the chromic oxide was observed.

While in the exemplary mixes only chromic oxide was used, this invention is not limited to impregnation with chromic oxide. It was used primarily because it has a dark green color which enabled a visual observation of the depth of impregnation into the zircon shapes. The fine oxide should be chosen to be chemically compatible with the oxide being impregnated and with the slags which might come into contact with the impregnated refractory in service. The following table contains a description of fine noncolloidal particles suitable according to this invention for a variety of refractories.

TABLE I

| Material | Composition | Average particle size |
|---|---|---|
| Volatilized silica [1] | $SiO_2$ | About 0.3 micron. |
| Pigment grade chromic oxide [2] | $Cr_2O_3$ | About 1 micron. |
| Micria AL [3] | $Al_2O_3$ | About 3.5 microns. |
| Micria 2R [3] | $ZrO_2$ | About 2.5 microns. |
| A-2 Alumina [4] | $Al_2O_3$ | About 1 micron. |
| Titanox AWD [5] | $TiO_2$ | Do. |

[1] Manufactured by Union Carbide Co.
[2] Manufactured by Hercules Powder Co.
[3] Manufactured by Monsanto Chemical Co.
[4] Manufactured by Alcoa.
[5] Manufactured by Titanium Alloy and Minerals Corp.

The agitation or vibration necessary to obtain impregnation is preferably about 60 cycles/sec. We have found, however, that ultrasonic vibration in the range of 40 kcs./sec. is also satisfactory.

Having thus described the invention in detail, and with sufficient particularity as to enable those skilled in the art to practice it, what is desired to have protected by Letters Patent is set forth in the following claims.

We claim:

1. A method of impregnating porous ceramic articles with noncolloidal ceramic particles comprising the steps of:
    (1) preparing a dispersed suspension in a carrier fluid of noncolloidal ceramic particles having a particle range in size between 0.1 and 5 microns, and selected from the group consisting of $SiO_2$, $Cr_2O_3$, $Al_2O_3$, $ZrO_2$, $TiO_2$, and mixtures,
    (2) immersing the ceramic articles in said suspension,
    (3) agitating said suspension by vibration at a frequency ranging from about 20 cycles to about 40 kilocycles per second for a sufficient period of time to impregnate at least a portion of said ceramic articles, and
    (4) drying the ceramic article to remove the carrier fluid.

2. A method according to claim 1 in which the ceramic articles have pore diameters substantially between 5 and 100 microns.

3. A method according to claim 1 in which the suspension is prepared with the aid of a dispersing agent.

4. A method according to claim 1 in which the noncolloidal particles range in size between 0.5 and 2.5 microns.

References Cited

UNITED STATES PATENTS 2,657,668  11/1953  Maier _____ 117—VT
2,809,126  10/1957  Murphy, Jr., et al. _____ 117—125
2,874,071  2/1959   Kadisch et al. _____ 117—123

ALFRED L. LEAVITT, Primary Examiner

W. F. CYRON, Assistant Examiner

U.S. Cl. X.R.

117—125, 169 R, DIG 8